Patented Jan. 1, 1924.

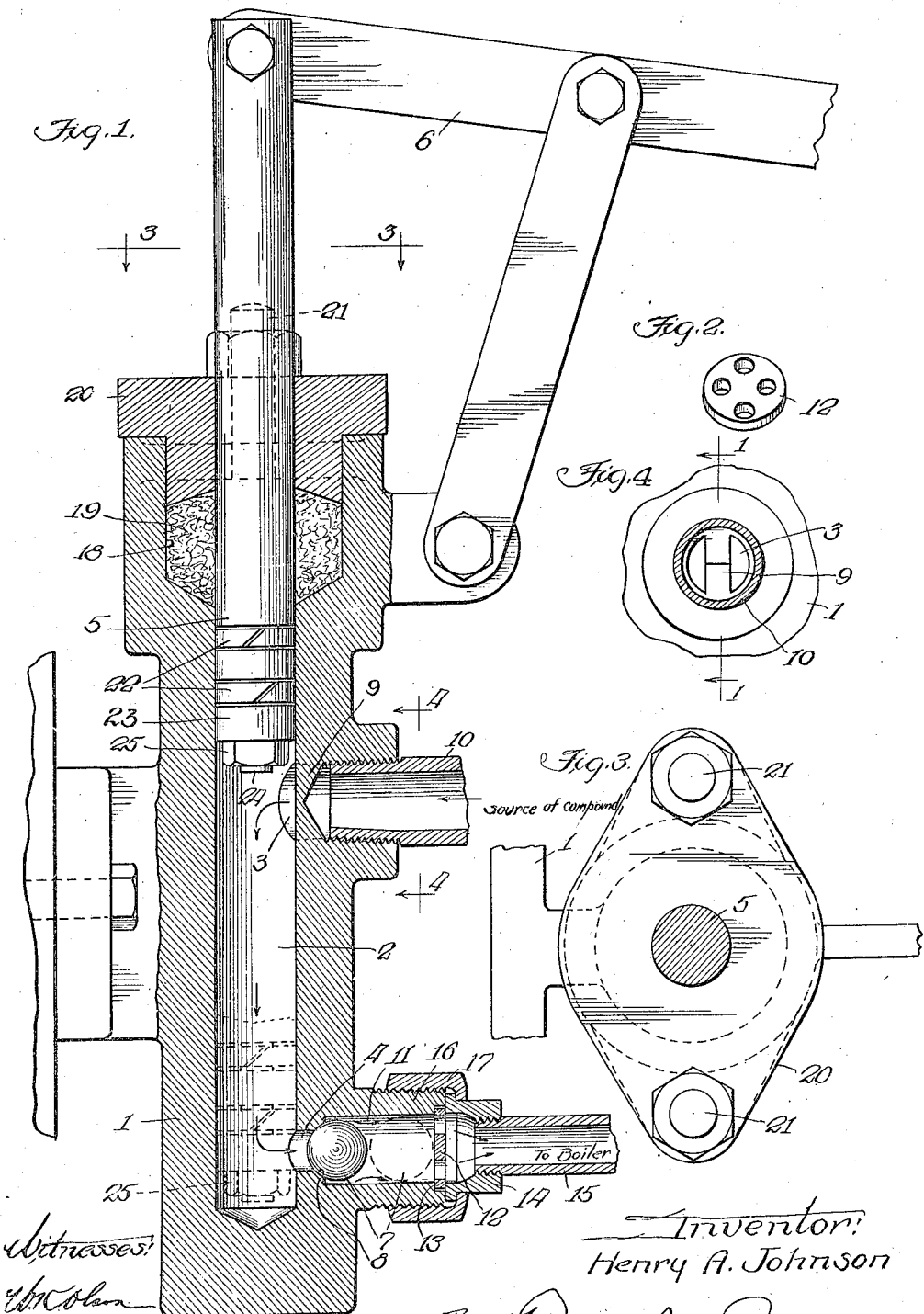

1,479,075

UNITED STATES PATENT OFFICE.

HENRY AUGUST JOHNSON, OF CHICAGO, ILLINOIS.

PUMP.

Application filed July 24, 1920. Serial No. 398,764.

*To all whom it may concern:*

Be it known that I, HENRY AUGUST JOHNSON, a citizen of the United States of America, and a resident of Chicago, county of Cook, State of Illinois, have invented certain new and useful Improvements in Pumps, of which the following is a specification.

This invention relates to force pumps, and especially to pumps adapted for injecting boiler compound into steam boilers. The main objects of the invention are to provide a pump for this purpose of simplified form having few and inexpensive parts and capable of operation for a long period without overhauling or repairs.

An illustrative embodiment of this invention is shown in the accompanying drawings, in which—

Fig. 1 is an axial section of the pump.

Fig. 2 is a perspective view of a perforated retainer plate for the spherical check valve.

Fig. 3 is a cross-section on the line 3—3 of Fig. 1.

Fig. 4 is a section at 4—4 on Fig. 1 and shows the plan of the inlet port.

To provide a successful pump for handling chemically active substances such as boiler compound, it is necessary to design the piston for use without a lubricant or any of the usual non-metallic packings. It is also preferable to provide a piston and cylinder of quite small diameter in order to produce a pump which is inexpensive and not bulky. For this reason a special design of piston is necessary for receiving the split piston rings. These, if of substantial cross section cannot be expanded over the piston into grooves therein without injury to the rings. To avoid the necessity of such expansion of metallic piston rings, the piston shown has an end portion which is reduced in diameter with respect to the normal diameter of the piston in order to receive the piston rings without necessitating their expansion. This reduced portion of the piston may be threaded at its end to receive a holding nut for the piston rings, and alternate rings are made solid in order to prevent leakage past the adjacent ends of the split rings.

In the construction shown in the drawings, the pump includes a frame consisting of a casting 1, having a cylindrical bore or piston chamber 2 which is provided with an inlet port 3 and an outlet port 4. The piston 5 is arranged for actuation by connections 6 operatively related to a moving part of some device actuated by the engine or the like (not shown), receiving power from the boiler. The outlet port 4 is provided with a valve adapted to prevent back flow toward the pump cylinder, which valve is preferably in the form of a ball 7. When the piston is moved forward towards the outlet port, the close-fitting body of the piston serves as a check-valve to close the inlet port 3. When the piston is withdrawn, the outlet valve 7 is closed against its axially apertured seat 8, and the suction of the piston 5 produces more or less of a vacuum in the cylinder until the piston proceeds far enough to open the inlet port, whereupon a charge of fluid to be pumped or injected rushes forward and is received into the chamber 2 ready for forcing through the discharge port 4 upon the return of the piston.

The inlet port 3 is cup-shaped with a multi-perforate bottom 9 (see Fig. 4) and is threaded to receive the supply tube 10.

The discharge port 4 communicates with a valve chamber 11, the outer end of which is provided with a perforated removable closure disk 12 resting on the shoulder 13. Said disk is secured in place by the fitting 14 to which the discharge pipe 15 is threaded. Said fitting 14 is secured to the hollow stem 16 by means of the threaded clamp 17. The ball valve 7 fits loosely in said chamber 11 and readily permits the material pumped to pass outward between it and the wall 16.

The outer end of the main cylinder is provided with a stuffing box 18 and packing 19 which is held in place by the end plate 20. Said plate is secured by bolts 21.

The piston 5 to which this invention is mainly directed comprises a body portion fitting the bore 2 of the cylinder 1, and at its lower end terminates in a portion 24 of less diameter than the body part so as to receive the metallic piston rings 22 and 23 without injury to these rings by attempting to expand them over the full diameter of a piston into grooves with which a piston is usually provided. The split rings 22 alternate with solid rings 23 which are of the same diameter as the body part of the piston. The split rings by expansion serve as usual to compensate for wear on the cylinder wall, and leakage past the opening between the ends of each split ring is prevented by the intervening solid rings. The piston rings may be retained in place by means of a nut 25 threaded to the end of the reduced part 24 of the piston.

In operation the piston is reciprocated by any desired means. The valve 7 is normally kept closed by the pressure in the boiler connection 15. When the piston 5 is withdrawn, as in Fig. 1, the vacuum formed in the chamber 2 causes fluid to rush in at 3 from the source of boiler compound. Then when the piston is thrust forward the port 3 is closed thereby and sufficient pressure is generated to force the liquid out past the valve 7 and into the boiler connection tube 15.

Although but one specific embodiment of this invention has been herein shown and described, it will be understood that numerous details of the construction shown may be altered or omitted without departing from the spirit of this invention as defined by the following claim.

I claim:

In a force pump adapted for feeding boiler compound into a steam boiler, a piston rod having on its active end a piston of the same diameter as the main body part of said rod, said piston comprising a reduced axial extension of said rod in combination with a series of alternately arranged solid and split rings and means on the outer end of said extension to secure said rings demountably, the said split rings being naturally somewhat expansive but sufficiently compressible radially to permit forcing them into the bore of the pump when in place on said extension, and said main body part being adapted to serve as a check valve when said piston rod is advanced.

Signed at Chicago this 21st day of July, 1920.

HENRY AUGUST JOHNSON.